L. H. SHOVER.
CANDY JAR.
APPLICATION FILED SEPT. 18, 1922.
1,438,615.
Patented Dec. 12, 1922.
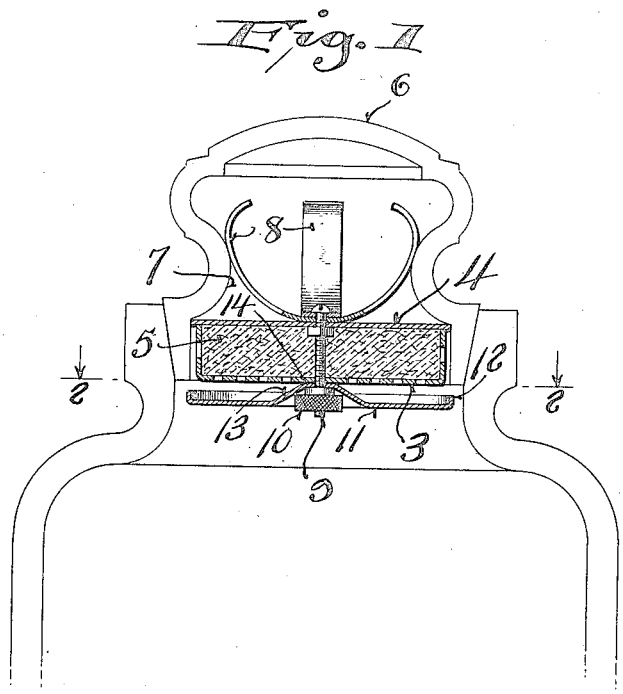
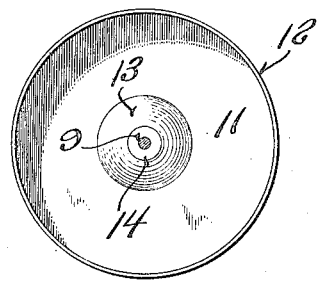

Patented Dec. 12, 1922.

1,438,615

UNITED STATES PATENT OFFICE.

LAMAR H. SHOVER, OF MILWAUKEE, WISCONSIN.

CANDY JAR.

Application filed September 18, 1922. Serial No. 588,883.

*To all whom it may concern:*

Be it known that I, LAMAR H. SHOVER, a citizen of the United States, and resident of Milwaukee, in the county of Milwaukee and State of Wisconsin, have invented certain new and useful Improvements in Candy Jars; and I do hereby declare that the following is a full, clear, and exact description thereof.

This invention pertains to a device for altering the condition of humidity within a closed jar or container.

The primary object of the invention resides in the provision of a simple and economical device of the above character, which does not require a specially constructed jar, but is applicable to any standard or conventional type, such as glass candy or cigar jars provided with the usual hollow cap.

An object is to provide a hygroscoper or humidifier with resilient means for engaging the interior of a hollow cap, whereby the device is detachably retained within the cap.

A more specific object is the provision of improvements in the device, on which application for patent, Serial No. 572,687, was filed by applicant July 3 1922, entitled candy jars. An apron is provided immediately below the humidifier. The object of the apron structure is the catching of drops of liquid falling from the humidifier or hygroscope so that there is no danger of damage to the contents of the jar. The structure is designed to permit circulation of the air so that the moisture may be carried from the humidifier and an effective humidifying action may be produced.

An object of the improvement is the provision of a structure of especial simplicity. The apron requires no complicated attaching means, but utilizes the screw of the humidifier or hygroscope as a support. The apron is readily assembled and separated from the rest of the device.

With the above and other objects in view, which will appear as the description proceeds, my invention resides in the novel construction, combination, and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a vertical sectional view through a humidity regulator constructed in accordance with the present invention and showing the same applied to a conventional type of glass candy jar.

Figure 2 is a horizontal section on the line 2—2 of Figure 1.

Referring now more particularly to the accompanying drawings, the present invention, which is designed to reduce or increase the humidity within a container, comprises a housing consisting of a cylindrical cup 3 having perforations in its bottom and side wall projecting slightly beyond the outer periphery of the cup and provided with a cover or closure 4. Positioned within the housing is a porous pad 5, of any suitable material, adapted to be saturated with a moistening material, where it is desired to increase the humidity within the jar, or with a moisture absorbing material where it is desired to reduce the humidity.

In the present instance, the housing is shown positioned within the mouth of a hollow cap 6, which cap is provided with an annular contracted portion 7 engaged by a plurality of resilient radial arms 8 secured to the housing by means of a bolt 9 passing through the cover 4 and the cup 3, which bolt, in addition to securing the resilient arms to the cover, also serves to lock the entire assembled device together, the bolt being provided with a knurled thumb nut 10.

From the foregoing it is obvious that the device can be readily dissembled when it is desired to change the pad contained in the housing to either decrease or increase the humidity, and it will also be seen that the resilient means provided enables the device to be quickly inserted or removed from a conventional hollow cap, the resilient arms compensating for slight variation in size and shape of the cap.

Attention is also directed to the fact that the projecting cover 4, which abuts the annular contracted portion 7 of the cap, serves to space the cup from the sides of the cap, thereby enabling the air to entirely surround the perforated sides of the cap, insuring the efficient action of the device in either decreasing or increasing the humidity within the container.

The apron 11 is substantially disc-like and its outer edge is upwardly directed, forming a flange 12. A central conical boss 13 projects upwardly, terminating in a small flat portion 14 having an aperture therein. Screw 9 extends through the aperture and nut 10 contacts with the lower face of portion 14 and holds it tightly against the bottom of cup 3. It is apparent that the dimensions of the boss are such that the apron is spaced away from cup 3. The flange 12 of the apron is spaced also from the lower edge of hollow cap 6. Room is therefore provided for the ingress and egress of air so that air is subjected to the humidifying or hygroscopic action of pad 5 and is then free to move away. The moisture dripping from the pad is not permitted to come in contact with the contents of the jar, as the drippings will be caught in the apron which projects laterally on all sides for a slight distance beyond the sides of the cup 3.

On the lifting of the hollow cap 6, there is no danger of escape of the collected moisture in the apron, as the flange 12 prevents the outflow thereof. While the apron is larger in horizontal dimensions than cup 3, it does not interfere with the centering of hollow cap 6 in the mouth of the jar, as flange 12 is spaced inwardly from the edges of the hollow cap.

It is apparent that the apron is readily assembled with the rest of the device, the mere adjustment of nut 11 serving to secure it readily in position. The structure of the apron is reduced to the lowest terms of simplicity, and for its attachment, parts of the old humidifier are utilized. The apron may be conveniently removed from the rest of the device and is easily cleaned so that it may at all times be maintained in a sanitary condition. It is made of thin metal, preferably aluminum.

The apron is not limited in its application to the particular type of jar cap shown, nor to the particular type of device for regulating humidity, but is of general application and useful with devices of various kinds.

I claim:

1. The combination of means for taking up water from the air, and a flat pan provided with an upwardly directed boss adapted to contact with the bottom of said means and space said pan from said device for regulating humidity.

2. The combination of means for taking up water from air, a pan, an upwardly directed boss on said pan, and retaining means directed downwardly through said means and said boss and securing said boss to said means.

3. The combination of means for taking up water from air, said means having a flat perforated bottom, a pan and a conical boss upwardly directed from said pan terminating in a flat surface abutting against said bottom.

4. The combination of means for taking up moisture from air, a pan therebelow, a boss on said pan, a screw downwardly directed through said means and said boss, and a nut threaded on said screw and securing said boss tightly against said means.

5. The combination of means for taking up moisture from the air, a pan, a boss on said pan secured to said pan, and a peripheral flange on said pan upwardly directed therefrom.

6. The combination of a perforated cup, a pad therein, an apron provided with an upwardly directed boss, and means extending through said cup and said boss and securing said boss to said cup.

In testimony that I claim the foregoing I have hereunto set my hand at Milwaukee, in the county of Milwaukee and State of Wisconsin.

LAMAR H. SHOVER.